April 10, 1934. C. G. STRANDLUND 1,954,151
PLOW
Filed Feb. 12, 1931 2 Sheets-Sheet 1

INVENTOR
Carl G. Strandlund
BY Brown, Jackson
Boettcher & Dienner
ATTORNEY

April 10, 1934.  C. G. STRANDLUND  1,954,151

PLOW

Filed Feb. 12, 1931  2 Sheets-Sheet 2

INVENTOR
Carl G. Strandlund
BY Brown, Jackson
Boettcher & Dienner
ATTORNEY

Patented Apr. 10, 1934

1,954,151

UNITED STATES PATENT OFFICE 1,954,151

PLOW

Carl G. Strandlund, Moline, Ill., assignor to Deere & Company, Moline, Ill., a corporation of Illinois Application February 12, 1931, Serial No. 515,153

30 Claims. (Cl. 97—32)

My invention concerns disk plows and has to do more particularly with that species commonly known as reversible disk plows.

The present invention is an improved construction over that disclosed in my copending application, Serial No. 472,239, filed August 1, 1930. In this earlier construction I disclose a reversible disk plow which is especially adapted to be drawn back and forth across a field in plowing, cutting furrow slices from the same side of the land at all times. Upon reaching the end of the rows in this type of plow, the horses or other draft source may be turned around to reverse the field without raising the disk from the previously completed furrow. That is, the frame of the implement is not turned end for end, but the transposition of the furrow opening disk from one furrow to the next in working the field is taken care of by the automatic shifting of the disk with the reversal of the draft means. The disk scraper is also simultaneously shifted with the disk upon reversing the draft means so as to be in proper position relative to the disk on the return trip across the field.

The present invention involves an improved scraper mounting whereby the scraper is yieldingly held against the cutting disk and capable of movement away from the disk when foreign matter, such as clods, rocks, etc., becomes entangled or caught between the scraper and disk which condition occasionally happens in traversing the field. My improved mounting structure therefore prevents possible damage or breakage to the disk or scraper and associated parts.

An added feature of this improved scraper mounting is that compensation for any wear of the scraper or disk is automatically provided for due to the scraper being yieldingly held against the disk.

Another object of the present invention is the provision of an improved and simplified means for raising and lowering the frame and cutting disk of the plow with respect to the supporting wheels and with consequent greater adjustment of furrow depth. In the aforementioned copending application, the main raising and lowering mechanism of the plow frame allowed the cutting disk to be lowered to a depth equal to the depth of the wheels. Auxiliary or supplementary means was provided whereby the cutting disk could be lowered a substantial amount below the depth of the wheels, a position necessary when opening up the land, that is, in forming the first furrow. My improved construction obviates the auxiliary or supplemental raising and lowering means while, at the same time, providing for raising and lowering of the cutting disk the required amount to open up the field in cutting the first furrow.

Still further, another object of the present invention is the provision of improved means connecting the raising and lowering mechanism with the wheel spindles in a manner which permits limited rotation of the latter with respect thereto.

Other objects and advantages of the present invention will be apparent to those skilled in the art after a consideration of the following detailed description of a preferred embodiment of the same, taken in conjunction with the accompanying drawings, in which:

Figure 5 is a fragmentary sectional view taken substantially along the line 5—5 of Figure 1 and showing my improved scraper mounting.

Figure 1:
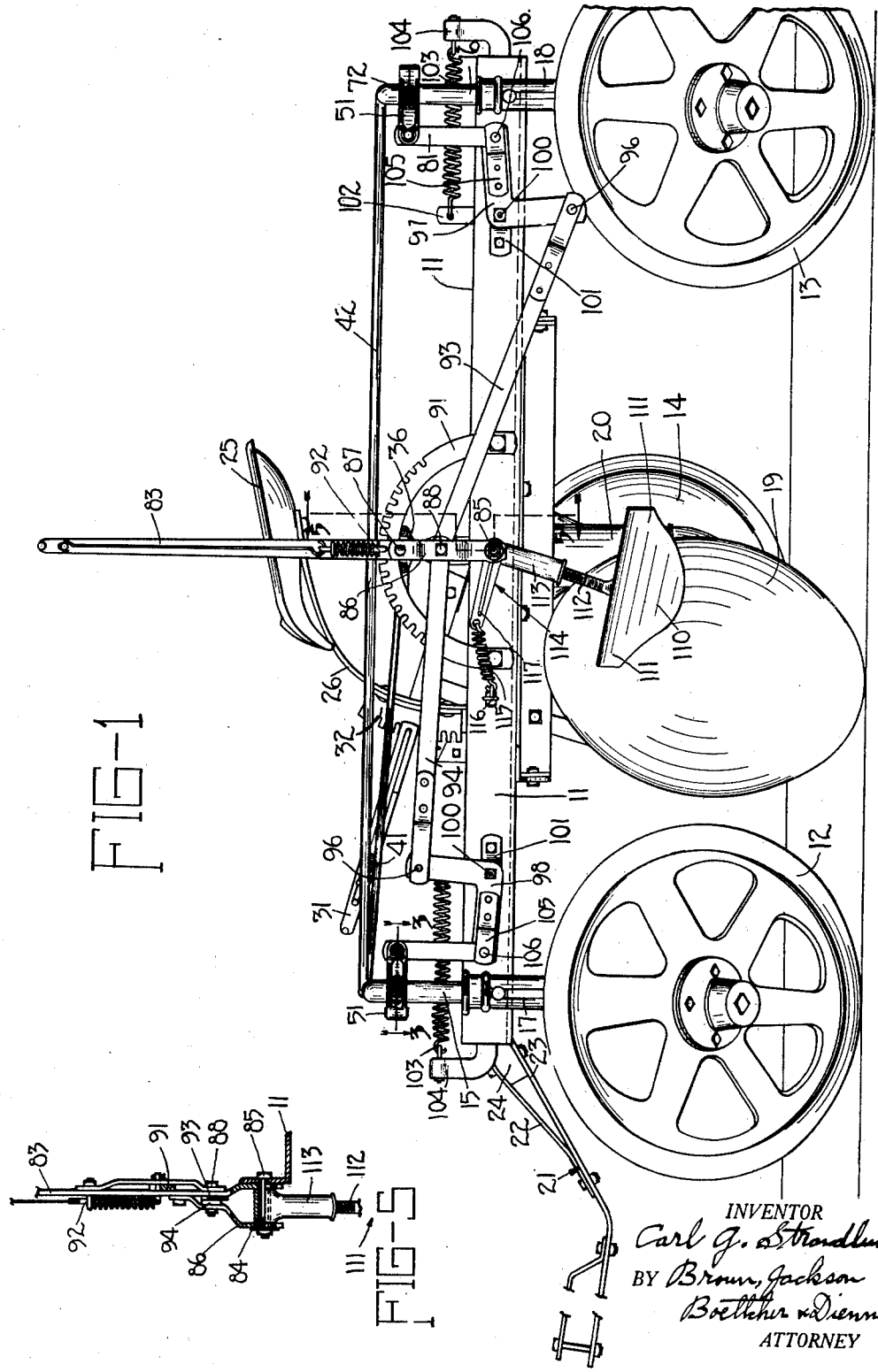
Figure 1 is a fragmentary side elevation of a reversible disk plow illustrating a preferred embodiment of my invention and showing the furrow opening disk lowered in operative position.

Referring to the drawings, the frame of the plow is indicated in its entirety at 11, and the frame is supported on furrow wheels 12 and 13, and land wheel 14. The land wheel 14 is journaled on a bent axle (not shown) extending from the frame on the landward side thereof. Spindles 15 and 16 have both rotatable and vertical movement with respect to a pair of journal sleeves 17 and 18 mounted on the frame 11 for a purpose to be brought out later. The furrow wheels 12 and 13 are mounted on the lowermost ends of the spindles 15 and 16. A disk 19 is mounted below the center of the frame by a suitable supporting member 20 which is journaled on the frame for movement about a vertical axis.

The draft source is attached to the tongue 21 which comprises straps 22 and 23 separated by a block or blocks 24. The tongue 21 is mounted centrally of the frame and pivots horizontally in a semi-circle around the landward side of the implement when the horses or other draft source are turned at the end of the furrow. The operator's seat 25 is mounted on a support 26, which support 26 is, in turn, rigidly mounted on the tongue 21 so that the operator's seat always faces the direction in which the implement is moving.

In disk plowing it is frequently necessary to give the wheels a certain amount of pitch or lead in order to hold the plow up against the land. In a reversible disk plow of this type it is necessary that this angle of lead be changed with respect to the frame each time the direction of plowing is reversed in order that the wheels may be pitched in the proper direction with respect to the new direction of travel. In my improved construction this is accomplished by means of a lever 31 mounted on the tongue 21 and having a short arm carrying a lug or bracket 36 to which is connected a link 41 leading to the spindle 15 and adapted to turn the same. The spindles 15 and 16 are connected to turn together by means of a connecting link 42, the link 42 being connected to lateral arms (not shown) extending from the spindles 15 and 16. The landward wheel 14 is also connected to be rocked by the lever 31 by means more clearly shown in the copending application referred to above. Thus, moving the lever 31 up or down will turn the furrow wheels and land wheel furrowward or landward as the case may be. This feature is of importance, not only in holding the plow body or disk 19 in proper position up against the land according to the character of the soil and other factors, but also the lever 31, being connected to all three wheels, functions as a means for steering the plow. When the plow encounters an obstacle and is forced out of the furrow the lever 31 may be used to steer the plow back into the furrow thereby making it possible to bring the plow back to its work more quickly than if this had to be done solely by maneuvering the team, tractor or other draft source.

Figure 3:
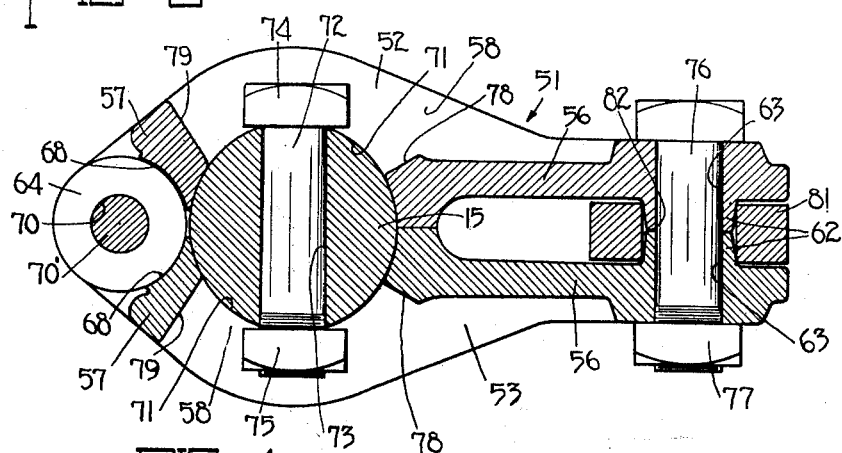
Figure 3 is an enlarged sectional view of the novel connecting means taken along line 3—3 of Figure 1.

The mechanism for raising and lowering the plow frame 11 and disk 19 with respect to the supporting wheels will now be described. A connecting member 51 is secured to each of the spindles 15 and 16, and each member comprises a pair of castings 52 and 53 hinged together at one end for relative movement. These castings form a pair of legs which are identical in construction, as shown in Figure 3, and may be interchanged. Each casting comprises two sections or ribs 54 and 55 connected by the webs 56 and 57. An elongated opening 58 separates the two webs 56 and 57 for a purpose to be described later. The two sections or ribs 54 and 55 merge into a bolt eye 61 at one end of the casting and this bolt eye has a sleeved extension or boss 62 through which a cylindrical opening 63 is formed.

Figure 4:
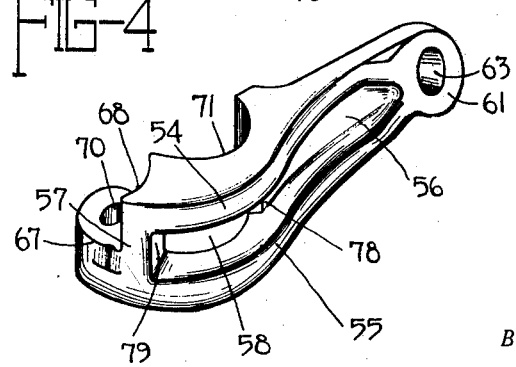
Figure 4 is a perspective view of part of the connecting means shown in Figure 3.

At the opposite end of the casting, a lug 67 is formed which comprises only half the height of the casting, as best seen in Figure 4, the remaining portion of the casting being provided with an arcuate recess or pocket 68 formed in the web 57. The lugs 67 are cylindrical in shape and fit one above the other when the castings are assembled, the outer periphery of each lug fitting snugly in the arcuate recess or pocket 68 of the opposite casting. A cylindrical bolt opening 70 passes vertically through the center of each lug for the reception of a bolt or rivet 70' whereby the two connected castings are hinged together. The inner edges of the sections or ribs 54 and 55 are formed with an arcuate shaped recess 71 so that when the castings are assembled the arcuate recesses 71 provide a complete cylindrical opening of slightly larger diameter than the diameter of the spindle upon which the castings are adapted to be mounted.

To assemble these castings 52 and 53 on the spindle 15, for example, a bolt 72 is first placed in position in a transverse hole 73 through the spindle. Then the two castings, hingedly secured together by the rivet or bolt 70', are placed around the spindle. The head 74 of the bolt 72 is accommodated in the elongated opening 58 between the ribs 54 and 55 of one casting while the nut 75 is positioned between the ribs 54 and 55 and in the elongated opening 58 of the other casting. The distance between the ribs 54 and 55 of each casting is substantially equal to the length of one side of the bolt head or nut, so that the nut and bolt are locked against turning when the castings are in position on the spindle. The two bosses 62 at the ends of the castings 52 and 53 are brought together when the castings are assembled around the spindle and, in being brought together, are projected through opposite sides of the hole 82 in the upper end of a link 81, the inner portions of the bosses thereby forming a sleeve or bearing about which the link 81 is pivoted. A bolt 76 is then inserted in the openings 63, and the two castings clamped together by tightening the nut 77 on the bolt 76. The two castings when assembled will allow the spindle 15 to rotate an amount equal to the length of the elongated openings 58, that is, the spindle 15 can rotate until the head 74 or nut 75 of the bolt 72 engages the ends 78 and 79 of the elongated openings 58. However, the extended head 74 and nut 75 prevent longitudinal movement of the spindle 15 in the castings 52, 53. The connecting member 51 for the spindle 16 is mounted in an identical manner.

A hand lever 83 is pivotally mounted on a sleeve 84 which extends laterally from the frame member 11, as best shown in Figure 5. The sleeve 84 is rigidly secured to the frame bar 11 by a bolt 85. The pivotal connection of the lever 83 on sleeve 84 is reinforced by a depending strap 86 fixed to the lever 83 by a rivet 87 and a bolt 88, and the free end of the strap is received on the outer end of the sleeve 84.

A semi-circular bracket or sector 91 is notched to receive the usual latch mechanism 92 for maintaining the lever 83 in any one of a number of predetermined positions.

Two links 93 and 94 are pivotally connected at one end to the lever 83 by means of a bolt 88 passing through the lever 83 proper and the strap 86, as best shown in Figure 5. The other or outer ends of the links 93 and 94 are pivotally connected, as at 96, to two bell cranks 97 and 98 respectively, mounted near opposite ends of the frame 11. The bell cranks 97 and 98 are pivoted to the frame 11 by means of short shafts 100 journaled in openings in the vertical leg of the frame member 11 and in openings formed in brackets 101 bolted to the frame member. One end of each shaft 100 is squared to receive a bell crank while the other end is provided with a vertically extended arm 102 which is connected by a spring 103 to a bracket 104 secured to the frame 11. The springs 103 are arranged to balance the weight of the frame 11 and associated parts to render adjustment of the plow easier.

Each of the arms of the bell cranks 97 and 98 opposite the links 93 and 94 carries a clip 105. The links 81, which are connected to the members 51 mounted on the spindles 15 and 16 as described above, are received between the clips 105 and their associated bell crank arms by pivot studs or rivets 106, as best shown in Figure 1.

By moving the hand lever 83 forwardly from the vertical position as shown in Figure 1, the lever 83 will pivot on the sleeve 84 to move the links 93 and 94 forwardly or in the direction of draft. The bell cranks 97 and 98 will, in turn, be rotated in a counter-clockwise direction to pull down on the links 81 and the connecting members 51 on the spindles 15 and 16. Thus, continued movement of the lever 83 forwardly will raise the frame 11 on the spindles 15 and 16 and consequently raise the disk 19 from furrow opening position.

When it is desired to lower the disk below that position shown in Figure 1, as for example when opening up the land, the lever 83 is pulled back or in a direction opposite to the direction of draft as shown in Figure 1. The bell cranks 97 and 98 will then rotate in a counter-clockwise direction about their journal support 100 on the frame 11 and thereby allow the frame and disk 19 to lower.

Although I have shown the lever 83 mounted in a vertical position in normal plowing operation, the position of this lever may be varied by modifying the lengths of the links 93 and 94 or by changing the position of the bell cranks 97 and 98.

Figure 2:
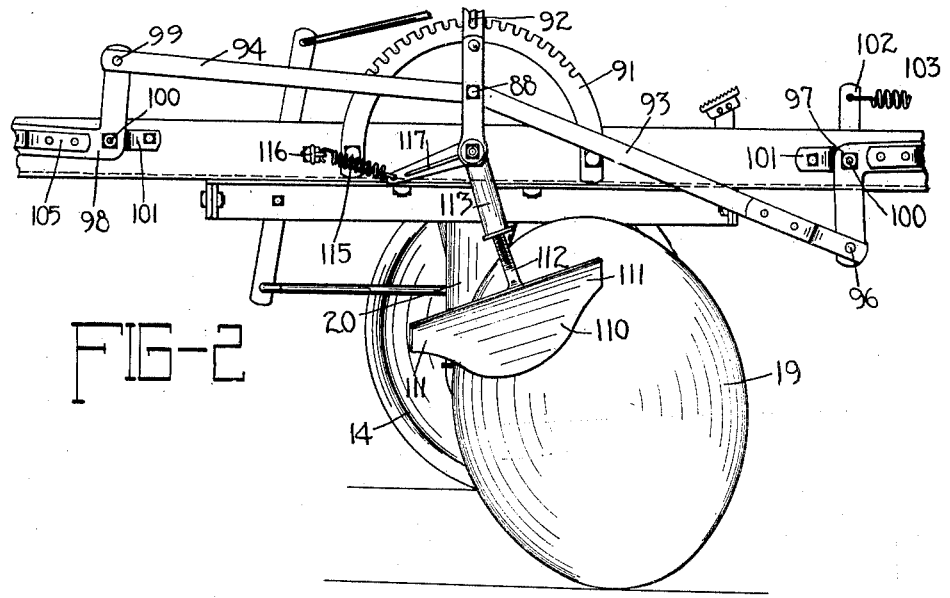
Figure 2 is a fragmentary side elevation of the plow showing the furrow opening disk and scraper in reversed or alternative position.

The scraper 110 is disposed adjacent the disk 19 and is fixed to a stem or shank 112 which is threaded into the depending arm 113 of a bell crank 114 on the sleeve 84 between the lever 83 and its reinforcing strap 86, as best shown in Figure 5. The scraper may be vertically adjusted relative to the disk by merely screwing the stem 112 further up into the sleeve 113 or by turning it back out of the sleeve. One end of the spring 115 is hooked to the frame 11, as at 116, and the opposite end of the spring is hooked to the other arm 117 of the bell crank 114. The spring 115 and the arm 117 are so arranged that the tension of the spring tends to swing the sleeve 113 in a longitudinal plane, thereby yieldingly holding the scraper 110 against the disk 19 in either position of the disk. Figure 1 shows the disk at one position and Figure 2 shows the disk in its reversed position. The longitudinal spring 115 thus serves as means limiting the swinging movement of the scraper so that when the disk is shifted from one position to the other, the scraper is prevented from swinging beyond its proper position in either direction. The scraper 110 is provided with oppositely extending wings 111 which always contact with the disk in either of its positions.

When reversing the draft connection 21 at the end of a furrow, the disk 19 is simultaneously shifted to its reversed position. The scraper 110 which is held under yielding tension against the disk will also pivot automatically about the sleeve 84 to the position shown in Figure 2. The stem 112 of the scraper also turns in the sleeve 113 when the scraper is shifted due to the concave shape of the disk and corresponding symmetrical shape of the scraper.

In this way the scraper 110 is yieldingly held against the disk 19 so that wear of the scraper is taken up and also clods, stones, and the like which might become wedged in between the scraper and disk will not cause breakage or prevent the disk from being moved into full reversed position because the scraper 110 can swing away from the face of the disk 19 against the tension of the spring 115, and in so doing it will be noted that the scraper 110 swings toward the center line of the disk 19.

While I have shown and described one embodiment of the present invention it is to be understood that the present invention is not to be limited to the specific details illustrated in the accompanying drawings but that widely different means may be employed in the practice of the broader aspects of my invention.

What I claim is:

1. In a plow, in combination, a frame, supporting wheels for the frame including vertically extending spindles, said frame being movable on said spindles, means for raising and lowering the frame relatively to the supporting wheels including a lever mounted on the frame and movable in either direction from a predetermined position for raising and lowering the frame, a bell crank journaled on said frame, a link connecting said lever to one arm of said bell crank, a member on one of said spindles and connected to the other arm of said bell crank, said member comprising a pair of hinged sections for straddling said spindle and extending therefrom a predetermined extent and attached to said bell crank.

2. In a plow, in combination, a frame, supporting wheels for the frame, means for raising and lowering the frame relative to the wheels comprising a lever movable to any one of a series of positions, spindles disposed between said wheels and frame, bell cranks pivoted to the frame and connected to said lever, a member on each spindle comprising a pair of castings secured together and connected to one of said bell cranks, said spindles being capable of rotation relative to the members thereon, cooperative means carried by said members and said spindles to limit the turning movement of the latter relative to the former, and means for turning said spindles to adjust the angularity of the wheels.

3. In a plow, a longitudinally arranged frame, journal sleeves mounted on said frame near the ends thereof, supporting wheels for the frame including spindles slidable in said sleeves, bell cranks pivoted on the frame, each having one arm connected with said spindles, a lifting lever connected to the other arm of each of the bell cranks, means for connecting said bell cranks to said spindles comprising a pair of hinged castings embracing said spindles, and means on said spindles for preventing longitudinal movement of the members thereon.

4. A plow comprising, in combination, a supporting frame, a reversible disk disposed below said frame and movable relatively thereto to two positions, furrow wheels for supporting said frame, and a yieldable scraper directly mounted at a fixed pivot point on said frame to swing freely longitudinally of the frame and having contact with said disk in both positions.

5. A reversible disk plow comprising, in combination, a supporting frame, a disk pivoted to the frame, a draft member adapted to be moved from a forward position to a reversed position and to reverse said disk, furrow wheels for supporting said frame, means to adjust the frame relative to said wheels including a lever mounted on the frame and adapted to be moved from a central position in either direction to raise and lower the frame, and a yielding scraper on said frame and contacting with said disk.

6. A reversible disk plow including a disk shiftable to two positions, and a scraper having edges curved to conform to the disk in either of its shifted positions and mounted for movement about a horizontal axis, said scraper being capable of yielding movement away from said disk.

7. In a reversible disk plow, the combination of a scraper having edges curved to conform to the disk in any of its positions and mounted for movement about horizontal and vertical axes, said scraper being adapted to yield about said horizontal axis when encountering a predetermined resistance.

8. In a reversible disk plow, the combination of a scraper for the disk mounted on the frame for movement about a vertical axis and so shaped that it will be automatically reversed by the disk when the disk is reversed, and yielding means for mounting the scraper on the frame for movement toward the center of said disk and away from the face thereof.

9. In a reversible plow having a frame, a shiftable furrow opener including a disk, a scraper having edges curved to conform to the contour of the disk in any of its positions, and means operably movable in a substantially vertical plane for mounting the scraper on said frame and providing vertical and horizontal axes about which the scraper may pivot, said scraper being movable longitudinally of the frame about said horizontal axis.

10. In a reversible plow having a frame, a shiftable furrow opening disk, a scraper having a stem and having edges curved to conform to the contour of the disk in any of its positions, and means for mounting the scraper on said frame and providing vertical and horizontal axes about which the scraper may pivot, said means comprising a sleeve to receive said stem and about which said scraper may turn.

11. In a reversible plow having a frame, a shiftable disk, a scraper having edges curved to conform to the contour of the disk in any of its positions and provided with a vertically extending stem, and means for mounting the scraper on said frame and providing vertical and horizontal axes about which the scraper may pivot, said means comprising a bell crank having a depending sleeved arm for the reception of said stem, said bell crank being journaled on said frame about a horizontal axis.

12. In a reversible plow having a frame, a shiftable disk, a scraper having a stem with edges curved to conform to the contour of the disk in any of its positions, and means for mounting the scraper on said frame and providing vertical and horizontal axes about which the scraper may pivot, said means comprising a bell crank journaled on said frame for movement about a horizontal axis and having a depending sleeved arm for the reception of said scraper stem, the other arm of said bell crank being yieldingly connected to said frame whereby said scraper will pivot about its horizontal axis should an obstacle come between the scraper and disk.

13. A reversible plow having a frame, a shiftable disk, a scraper having a stem and edges curved to conform to the contour of the disk in any of its positions, and means for mounting the scraper on said frame and providing a vertical and a horizontal axis about which the scraper may pivot, said means comprising a bell crank journaled on said frame and having a sleeved arm for the reception of said scraper stem, a spring connecting the other arm of said bell crank to the frame for yieldingly holding said scraper against said disk.

14. In a plow, in combination, a frame, supporting wheels for the frame including two furrow wheels mounted for steering movement in a horizontal plane and for vertical movement relative to the frame, a shiftable disk, a pivoted draft member movable to two positions and adapted to shift the disk, means for raising and lowering the frame relative to said wheels comprising a lever pivotally mounted on the frame, means for steering said wheels comprising a lever mounted on said draft member, a scraper having edges to conform to the disk in either of its positions and mounted for movements about a vertical and a horizontal axis, a bell crank journaled on said frame and comprising a pair of arms, said scraper depending from one of said arms and contacting said disk, the other of said arms being spring connected to the frame to yieldingly hold the scraper up against the disk.

15. In a reversible plow having a frame supporting a disk, the combination of a scraper for contacting the disk, and scraper supporting means pivotally mounted on a horizontally disposed pivot pin extending outwardly from the frame substantially at right angles to the direction in which said plow travels, said scraper being pivotally connected with said means to rotate about a substantially vertical axis and cooperable with the disk to automatically change from one operative scraping position to the other as said disk is reversed.

16. In a reversible plow having a frame supporting a disk, the combination of a scraper for contacting the disk, scraper supporting means pivotally mounted on a horizontally disposed pivot pin extending outwardly from the frame substantially at right angles to the direction in which said plow travels, said scraper being pivotally connected with said means to rotate about a substantially vertical axis and cooperable with the disk to automatically change from one operative scraping position to the other as said disk is reversed, and yieldable means connected with said scraper supporting means and acting to turn the latter about its pivot pin to maintain the scraper in contact with the disk under normal operating conditions.

17. A plow comprising, in combination, a supporting frame, a reversible disk disposed below said frame and shiftable to two positions thereon, means operably connected with said frame and supporting said scraper for universal movement relative to the frame, and yieldable means extending between the aforesaid means and said frame to hold said scraper in yielding contact with said disk and to enable the aforesaid means to move the scraper freely transversely of the disk when the latter is shifted and away from the disk when the scraper encounters a predetermined obstacle.

18. A plow comprising, in combination, a supporting frame, a reversible disk disposed below said frame, furrow wheels for supporting said frame, a scraper eccentrically contacting the face of the disk, and means connected with the frame for supporting said scraper and to maintain the same in contact with the face of the disk, said means enabling said scraper to move towards the center of the disk and away from the face thereof when the scraper encounters a predetermined obstacle and when the disk is reversed.

19. A plow comprising, in combination, a supporting frame, a reversible disk carried by said frame and movable about a substantially vertical axis, a scraper cooperating with the face of said disk, and means connected with the frame and disposed in substantially transverse alignment with respect to the axis about which said disk is reversible for supporting said scraper for movement substantially longitudinally of the frame about an axis disposed at an angle to the plane of the disk.

20. In a plow, in combination, a frame, supporting wheels for said frame, means for raising and lowering the frame relative to the wheels comprising a lever movable to any one of a series of positions, spindles disposed between said wheels and frame, said spindles each having lateral arms at the upper ends thereof, bell cranks pivoted to the frame and connected with said lever, a member on each spindle comprising a pair of castings secured together and connected with one of said bell cranks, said spindles being capable of rotation relative to the members thereon, and means connected with said spindle arms for turning the spindles to adjust the angularity of the wheels.

21. A plow comprising, in combination, a wheel supported plow carrying frame, a disk carried by said frame and swingable to two positions by movement relative to said frame, and a yieldable scraper supported on said frame to swing freely longitudinally thereof and cooperating with said disk.

22. A reversible plow comprising, in combination, a wheel supported plow carrying frame, a reversible disk carried by said frame, and a yieldable scraper supported on said frame for swinging movement in a substantially longitudinal plane across the face of said disk, said scraper being shiftable relative to said disk by the movement of the disk when the latter is reversed.

23. A reversible disk plow comprising, in combination, a supporting frame, a disk pivoted to the frame for movement about a substantially vertical axis, a draft member adapted to be moved from a forward position to a reversed position and to reverse said disk, furrow wheels for supporting said frame, means to adjust the frame relative to said wheels including a lever mounted on the frame and adapted to be moved from a control position in either direction to raise and lower the frame, and a yieldable scraper contacting with said disk and pivoted on said frame for movement about a substantially vertical axis eccentrically disposed to the pivot axis of said disk.

24. A plow comprising, in combination, a supporting frame, a reversible disk carried by said frame and movable to two positions thereon, said disk being arranged in a plane disposed obliquely with respect to the line of advance in either of said positions, a scraper cooperating with the face of said disk, means connected with the frame for supporting said scraper for movement substantially longitudinally of the frame about an axis disposed at right angles to the longitudinal axis of the frame, and means cooperating with said last named means for urging the scraper against said disk in either of its positions.

25. An agricultural implement comprising a frame, supporting wheel means therefor including a substantially vertically disposed spindle on which said frame is movably carried, and means for raising and lowering the frame relative to the supporting wheel means and including a member embracing said spindle and comprising a pair of hingedly connected sections and means securing the sections together about said spindle.

26. An agricultural implement comprising a frame, supporting wheel means therefor including a substantially vertically disposed spindle on which said frame is movable, and means for raising and lowering the frame relative to the supporting wheel means and including a member embracing said spindle and comprising a pair of hinged sections hingedly secured together at one end and embracing said spindle, and cooperative means on said spindle and said sections for preventing relative longitudinal movement therebetween.

27. An agricultural implement comprising a frame, supporting means therefor including a substantially vertically disposed spindle on which said frame is movably carried, means for raising and lowering the frame relative to said supporting means and including a member embracing said spindle and provided with a pair of oppositely disposed slots, and means carried by said spindle and having its opposite ends projecting therefrom and disposed in said slots and cooperating with said member for preventing relative longitudinal movement between the member and said spindle and providing for rotation of said member with respect to the spindle.

28. An agricultural implement comprising a frame, supporting means therefor including a substantially vertically disposed spindle on which said frame is movably carried, means for raising and lowering the frame relative to said supporting means and including a member embracing said spindle and provided with a slot, and bolt means carried by the spindle and provided with a head disposed in said slot to prevent relative longitudinal movement between said member and the spindle and to provide for limited relative rotation therebetween.

29. An agricultural implement comprising a frame, supporting means therefor including a substantially vertically disposed spindle on which said frame is movable, and means for raising and lowering the frame relative to said supporting means and including an operating member and a second member embracing said spindle and comprising a pair of complementary sections hingedly connected together at one end and provided with means at their other ends to secure said sections together and to connect said second member with said operating member.

30. A plow comprising, in combination, a supporting frame, a reversible disk carried by said frame and swingable to two positions by movement relative to said frame, a scraper supported on said frame to swing longitudinally thereof and cooperating with said disk, and means serving to limit the swinging movement of the scraper in both directions.

CARL G. STRANDLUND.